United States Patent
Gulsvig Wood et al.

(10) Patent No.: US 10,749,978 B2
(45) Date of Patent: Aug. 18, 2020

(54) TAGS FOR AUTOMATIC CLOUD RESOURCE PROVISIONING

(71) Applicant: Accenture Global Solutions Limited, Dublin OT (IE)

(72) Inventors: Catherine Ruth Gulsvig Wood, St. Paul, MN (US); Billie John Criddle, Paignton (GB); Roberto Javier Torres Sovero, London (GB); Hariharan Venkataramani, Tamilnadu (IN); Sanjana Aggarwal, Delhi (IN)

(73) Assignee: Accenture Global Solutions Limited, Dublin (IE)

( * ) Notice: Subject to any disclaimer, the term of this patent is extended or adjusted under 35 U.S.C. 154(b) by 156 days.

(21) Appl. No.: 15/481,799

(22) Filed: Apr. 7, 2017

(65) Prior Publication Data
US 2018/0295202 A1    Oct. 11, 2018

(51) Int. Cl.
*H04L 29/08*    (2006.01)
*G06F 16/81*    (2019.01)
(Continued)

(52) U.S. Cl.
CPC ...... *H04L 67/2804* (2013.01); *G06F 3/04817* (2013.01); *G06F 3/0638* (2013.01);
(Continued)

(58) Field of Classification Search
CPC ............. H04L 67/2804; G04F 3/04817; G06F 17/30268; G06F 17/30525; G06F 16/24573; G06F 16/81; G06F 16/5866
See application file for complete search history.

(56) References Cited

U.S. PATENT DOCUMENTS 9,596,207 B1 *   3/2017   Lin .................. H04L 51/32
9,929,998 B1 *   3/2018   Soundararajan ........ H04L 41/22
(Continued)

FOREIGN PATENT DOCUMENTS

WO   WO 2017/049439 A1   3/2017

OTHER PUBLICATIONS hastags.org, "Twitter Hashtag Auto-complete Leads to Better Engagement," published Jul. 11, 2013 (Year: 2013).*
(Continued)

*Primary Examiner* — Eric J Yoon
(74) *Attorney, Agent, or Firm* — Brinks Gilson & Lione

(57) ABSTRACT

A dynamic tagging system facilitates the control, monitoring, and operation of technical components, such as virtual machines, in cloud environments. The dynamic tagging system performs an analysis on unstructured metadata tags linked to the technical components. The unstructured metadata tags may be created for technical components by authorized operators of the technical components, for instance. The dynamic tagging system may analyze an individual unstructured metadata tag or a combination of unstructured metadata tags assigned to a technical component to automatically trigger any pre-configured control, monitoring or operational actions for the technical component. As one example, the dynamic tagging system detects a trigger condition for an action trigger to perform automated electronic communications between any selected entities to convey information about the technical component.

21 Claims, 13 Drawing Sheets

(51) Int. Cl.
    *G06F 16/11*     (2019.01)
    *G06F 16/58*     (2019.01)
    *G06F 16/2457*     (2019.01)
    *G06F 9/50*     (2006.01)
    *G06F 3/0481*     (2013.01)
    *G06F 3/06*     (2006.01)

(52) U.S. Cl.
    CPC .......... *G06F 9/5077* (2013.01); *G06F 16/122* (2019.01); *G06F 16/24573* (2019.01); *G06F 16/5866* (2019.01); *G06F 16/81* (2019.01)

(56) References Cited

U.S. PATENT DOCUMENTS

| | | | |
|---|---|---|---|
| 2009/0327211 A1 | 12/2009 | McCune et al. | |
| 2015/0074194 A1* | 3/2015 | Schabes ................ | H04L 51/32 709/204 |
| 2016/0315995 A1 | 10/2016 | Hausler et al. | |
| 2018/0211229 A1* | 7/2018 | Rakshit ................ | G06Q 10/02 |

OTHER PUBLICATIONS

Extended European Search Report for European Application No. 18165970.7, dated Aug. 24, 2018, pp. 1-11.

\* cited by examiner

A

B

C

Resource Dashboard

Resource Type: Virtual Machine ▶

Operator: Operator 1

List of Technical Components

Edit Notes

| | Name/ID | OS | Provider | Notes |
|---|---|---|---|---|
| ☐ | VM1-1 — 603 | Windows | Provider 1 | @manager1 Please take a look. — 604 |
| ☑ | VM1-2 | Linux | Provider 1 | This is very #expensive! — 602 |
| ☐ | VM2-1 | Windows | Provider 2 | @manager1 This is a note. |
| ☐ | VM1-3 | Linux | Provider 1 | #expensive |
| ☑ | VM2-2 | Linux | Provider 2 | Not in use and #idle |

▼ Page 1 ▶ of 1 ▲

TAGS FOR AUTOMATIC CLOUD RESOURCE PROVISIONING

TECHNICAL FIELD

This application relates to centralized and automated monitoring, control, and operation of technical components, such as virtual machines and other computing resources hosted by cloud computing providers, responsive to tagging data.

BACKGROUND

Enterprises and organizations rely increasingly on cloud service providers to furnish computing resources and platforms for their operational needs. Technical components for cloud hosting, such as data storage layers and virtual machines for web servers, application servers, and databases servers are frequently requested and commissioned by remote operators authorized within an organizational unit through, e.g., a central cloud resource control system. Improvements in communication among the authorized operators regarding the control, monitoring and operation of technical components will further enhance the technical capabilities of cloud computing systems.

BRIEF DESCRIPTION OF THE DRAWINGS

FIG. 6 illustrates an example user interface for technical components populated with notes entered by remote operators.

DETAILED DESCRIPTION

Figure 1:
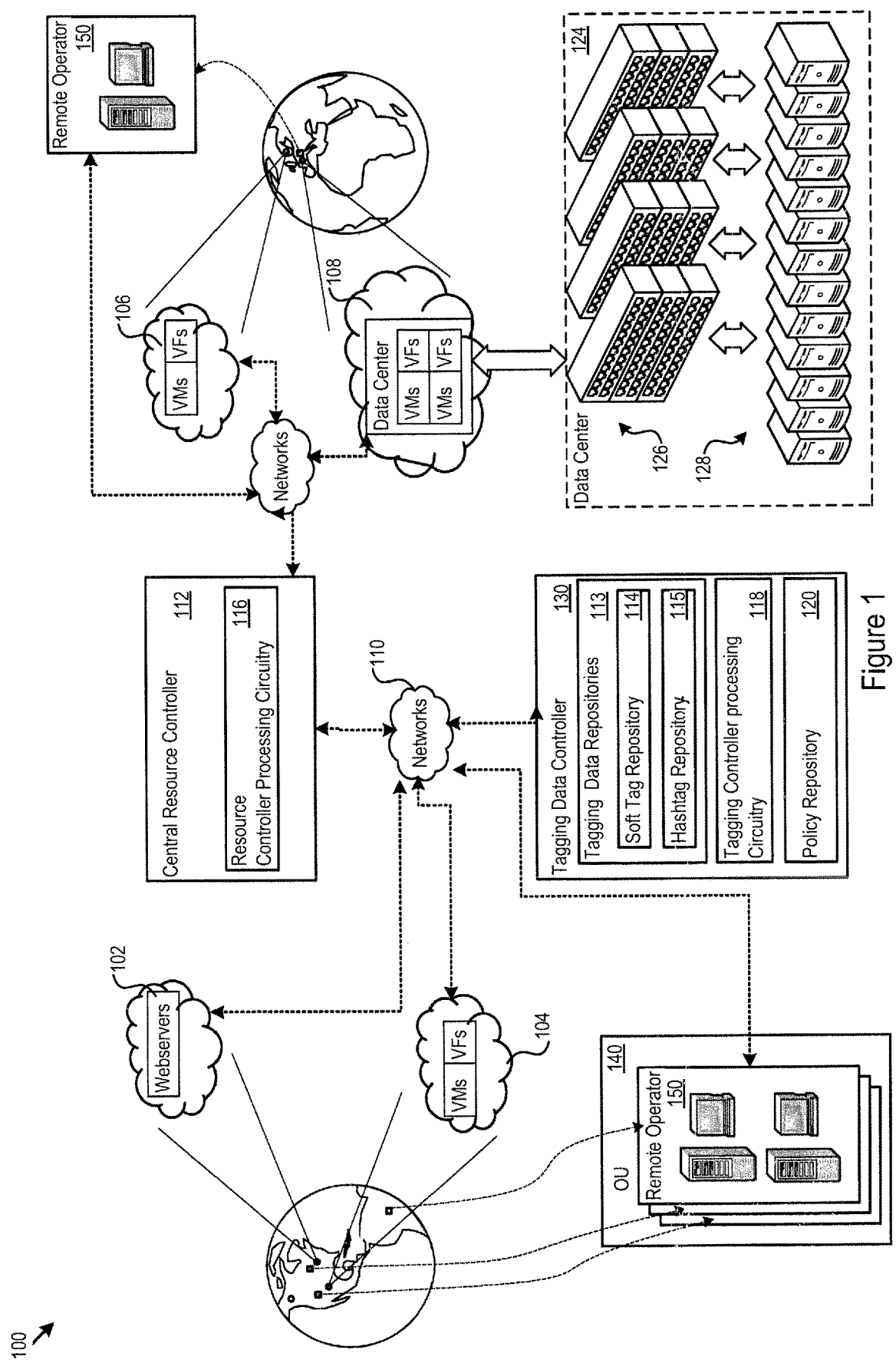
FIG. 1 shows an example cloud computing environment as a global cloud hosting and control system.

Enterprises and their individual organizational units (collectively referred to as OUs) rely increasingly on technical components such as virtual machines, webservers, and databases hosted by cloud computer service providers. Computing the cost to an OU attributable to technical components in the cloud may be directly tied to the number of actively commissioned technical components and their capabilities. The capability of a technical component typically correlates with the types and amounts of cloud resources the technical component includes. A commissioned technical component may become idle or under-used over time as the computing tasks it handles for the OU evolve or end. While actual usage of such a technical component may be monitored, a decision to decommission or reconfigure may depend on other business or operational considerations of the OU not readily reflected in monitored usage information. For example, decommission or reconfiguration decisions for the technical component may depend on future plans and thus may need input from multiple responsible parties for the OU associated with the technical component. Such decisions thus involve various rounds of communications and conversations among the multiple operators using isolated communication tools such as email and instant messaging. Invoking separate communication tools amidst tasks of controlling and provisioning the technical components has in the past been cumbersome, leading to delay or omission of important communications. Yet, timely and efficient decommission and reconfiguration decisions are critical for reducing computing cost for the OU.

As described below, communications about the technical components among operators may be integrated in a central resource controller for cloud resources. Specifically, a technical component allocated to an OU may be controlled and provisioned through the central resource controller by the remote operators associated with the technical component and authorized by the OU. Each operator authorized to carry out control tasks of the technical component may be given a control account in the central resource controller for accessing the control account remotely. Conversation related to the technical component may be automatically processed by the central resource controller while the technical component is being controlled or provisioned by the remote operators using tagging data in the form of notes. These notes may be unstructured in that they do not have any predefined required sections, components, or formatting, and may be freely input by the remote operators while controlling or provisioning the technical component. These unstructured notes may be alternatively referred to as tagging data, unstructured tagging data, metadata tags, unstructured tags, and the like. Each unstructured note may be associated with a particular technical component and entered by a particular authorized operator. As such, an operator does not need to switch to any separate and isolated communication tool, leading to improvement in communication and decision efficiency. The conversation and ultimate decision about a technical component is thus brought closer to the computing resources via the central resource controller. Recording of the unstructured notes provides a conversational history of the technical components which, in combination with control, provisioning actions taken, may provide more thorough audit trails of the technical components than any other compilation of purely technical or transactional data such as a configuration history.

For example, an operator, while monitoring and controlling a technical component in the central resource controller, may notice that the technical component has become idle and the operator is aware of no immediate future task that could be assigned to the technical component. Rather than invoking a separate communication tool, e.g., an email client, to communicate a message recommending decommission of the technical component to other operators associated with the technical component, the operator may use the central resource controller for tagging the technical component with unstructured notes containing her recommendation. The unstructured note may further trigger automatic actions, including automatic communication of her recommendation to other operators associated with the technical component, and other provisioning or control actions for the technical component. The actions may be automatically triggered either while the unstructured notes is being entered or after the unstructured note is entered in its entirety.

The disclosure below describes several exemplary implementations of tagging technical components using unstructured notes by remote operators in communication with the central resource controller. While the description below may focus on creation of unstructured notes and communication actions of information and recommendations among the operators triggered by the unstructured notes, the underlying principles and solutions apply to other control and provisioning actions of the technical component. In addition, the implementations below may refer to a particular technical component as an example. These implementations, however, are applicable to many different types of technical components hosted by cloud providers.

FIG. 1 illustrates a cloud computing environment in which a central resource controller and a separate tagging data controller may be implemented. The example in FIG. 1 shows one of many possible different implementation contexts. In that respect, the technical solutions below are not limited in their application to the architecture and system shown in FIG. 1, but are applicable to many other cloud computing implementations, architectures, and connectivity.

FIG. 1 shows an exemplary cloud computing environment as a global cloud hosting and control system 100. Distributed through the global cloud hosting and control system 100 are cloud computing service providers, e.g., the service providers 102, 104, 106, and 108 and various technical components hosted by the service providers in the form Infrastructure as a Service (IaaS) or Platform as a Service (PaaS), such as Virtual Machines (VMs), webservers, and databases. The global cloud hosting and control system 100 further includes remote operators and remote operator devices 150 associated with OUs 140; a Central Resource Controller (CRC) 112; and a tagging data controller 130. These distributed components of the global cloud hosting and control system 100 are interconnected by networks 110. The networks 110 may include private and public networks defined over any pre-determined and possibly dynamic internet protocol (IP) address ranges.

The service providers 102, 104, 106, and 108 may be located in any geographic region, e.g., United States (US) East, US West, or Central Europe. The geographic regions that characterize the service providers may be defined according to any desired distinctions to be made with respect to location. A service provider may provide cloud computing infrastructure in multiple geographic locations.

The service providers 102, 104, 106, and 108 may further provide computing resources in the form of IaaS or PaaS via hosting platforms. Each service provider has a widely varying set of technical characteristics in the individual target hosting platforms. Service providers 102, 104, 106, and 108 may support hosting platforms of similar or different characteristics for providing computing resources.

For instance, FIG. 1 shows a target hosting platform implemented by a data center 124 for the service provider 108. The data center 124 supports running many different virtual machines (VMs). The data center 124 may include a high density array of network devices, including routers and switches 126, and host servers 128. The host servers 128 support a particular set of computing functionality offered by the service provider 108 from the data center 124.

As just one of many examples, the service provider 108, through the data center 124 and its other infrastructure, may support many different types of VMs, differing by number of processors, amount of RAM, and size of disk, graphics processors, encryption hardware, or other properties; multiple different types of web front ends (e.g., different types and functionality for websites). The service provider 108 may further support several different types of database solutions (e.g., SQL database platforms); secure data storage solutions, e.g., payment card industry (PCI) data (or any other secure data standard) compliant storage; several different types of application servers; and many different types of data tiers. Further, the service provider 108 and the data center 124 may have various characteristics, including whether the data center 124 is an on-premise or public location; which networks can provide connectivity to the data center 124; which assets the service provider 108 supports; and other characteristics.

Examples of service providers 102, 104, 106 and 108 include Amazon, Google, Microsoft, and Accenture, who offer different target hosting platforms, e.g., Amazon Web Services (AWS), Google Compute Engine (GCE), Microsoft Azure (Azure), Accenture Cloud Platform (ACP), and Windows Azure Stack (WAS).

The global cloud hosting and control system 100 may further include OUs, such as the example OU 140 illustrated in FIG. 1. The OU 140 may be in need of computing services for their business and operations and may request and obtain various technical components each including a set of computing resources hosted by the service providers. A technical component, may, for example, be a VM as an infrastructure or a webserver offered as platform. Each technical component may be requested by the OU 140 and instantiated by the service provider to include a requested amount of hardware computing resources such as CPUs, Storage spaces, and memories. Operating system and other software stacks for these technical components may be installed by the OU after the requested technical component is instantiated or may be provided by the service provider with the technical component upon request.

The OU 140 may request technical components from more than one service providers of 102, 104, 106, and 108, depending on its various computing needs of different characteristics and the characteristics of the hosting platform provided by the various service providers. These request may be made via the CRC 112. Once a group of technical components are instantiated by the service providers for the OU 140, a team of operators 150 of the OU 140 may be given authority by the OU to control, monitor, and perform complex cloud architectural provisioning of the allocated technical components via the CRC 112. The authority, may be given in the form of control accounts each assigned to an authorized operator.

The control accounts may be accessed by the operators 150 remotely via remote operator devices including but not limited to personal computers, tablets, and mobile phones. The remote operator devices may be also referred to as remote operators even though a remote operator may access his/her control account via different remote operator devices and similarly, one remote operator device may be used by different remote operators to access their control accounts. A remote operator or remote operator device may be simply referred to below as an operator or operator device, e.g., the operators 150. An operator 150 may be given access to all technical components allocated to the OU. Alternatively, an operator 150 may be given access to a subset of the technical components of the OU. The OU may further restrict the scope of control and provisioning that an operator can perform.

As shown in FIG. 1, the global cloud hosting and control system 100 may further include the CRC 112, which provides a central point for the OU and the remote operators to make complex cloud architectural provisioning and execute decisions across multiple cloud services, taking into account the global network architecture 100, the various service provider locations and capabilities, and other factors. CRC 112 may include resource controller processing circuitry 116. The resource controller processing circuitry 116 is configured, among other functions, to provide a user interface to the remote operator 150 for controlling and provisioning various technical components hosted in the cloud. In particular, the resource controller circuitry 116 is configured to provide a user interface to the operator 150 for creating tagging data in the form of unstructured notes for technical components. The user interface, for example may be hosted in a webserver of the CRC 112 and provided to the remote operator 150 as, e.g., a dashboard, viewed and operated via a web browser application on the remote operator device 150. Alternatively, the user interface may be provided by an interface server of the CRC 112 and provided to the remote operator 150 as a dashboard via a client-end application installed on the operator device 150.

Among the many control and provisioning functions that may be performed by the operator 150 via the user interface, the operator 150 may in particular input tagging data in the form of unstructured notes linked to technical components. Accordingly, the global cloud hosting and control system 100 may further include a tagging data controller 130 for tracking and processing the unstructured notes provided by the operator 150 for tagging technical components. In particularly, the tagging data controller 130 may include repositories for the tagging data or unstructured notes. For example, the repositories for tagging data may include a soft tag repository 114 which stores all unstructured note data, and a hashtag repository 115 for maintaining hashtags processed from the unstructured note data. It is further contemplated that other processed data items from the raw unstructured notes may be maintained in various other repositories. Each of these repositories for the unstructured notes and data items processed from the unstructured notes may alternatively be broadly referred to as service items of the tagging data controller 130. A service item thus may refer to the soft tag repository, the hashtag repository, or another repository derived from the unstructured notes. The service items that are processed from the unstructured notes such as the hashtag repository 115, provide processed intermediate data items and thus help speed up response to inquiries for information from the remote operator 150. The various repositories above may be implemented in any type of database.

The tagging data controller 130 may further include tagging controller processing circuitry 118. The tagging controller processing circuitry 118 may be configured to maintain the soft tag repository, processing the unstructured notes into processed repositories such as the hashtag repository 115. The tagging controller processing circuitry 118 may further provide processed tagging data to the remote operator 150 either directly or via the CRC 112.

Further, the tagging data controller 130 may be configured to process the unstructured notes to identify action triggers. Action triggers may be directly embedded in the unstructured notes as, for example, predefined signaling special characters or symbols that may appear in the unstructured notes. A symbol, as an action trigger, may contain one special character or a special sequence of characters. Alternatively, action triggers may be derived from analyzing one or more unstructured notes and/or the service items against some predefined policies. The policies may include predefined conditions required for each particular predefined action. The policies may further include instructions for performing each particular predefined actions. Accordingly, the tagging data controller 130 may further include a policy repository 120 for maintaining the policies for deriving action triggers and instructions for actions. The actions being triggered may include any control, provisioning tasks for the technical components hosted in the cloud, and may include automatic communication/conversation actions among remote operators associated with a particular technical component.

Alternative to the implementation above, the CRC 112 and the tagging data controller 130 may be integrated together rather than being separate entities in communication with one another. Further, some of the action triggers may alternatively be identified within the user interface (e.g., resource dashboard) in the remote operator device rather than by the tagging data controller. For example, predefined special symbols that signify predefined actions may be monitored at the user interface as the unstructured note is being input by the remote operator 150, rather than after the unstructured note is communicated to and being processed by the tagging data controller 130. As such, the user interface on the remote operator device 150 may directly perform the triggered actions. In the case where the triggered actions require data or parameters from a backend, such data may be requested by the remote operator device from the backend directly to via the CRC 112 or the tagging data controller 130. Such a backend, may be part of or separate from CRC 112 or the tagging data controller 130.

Figure 2:
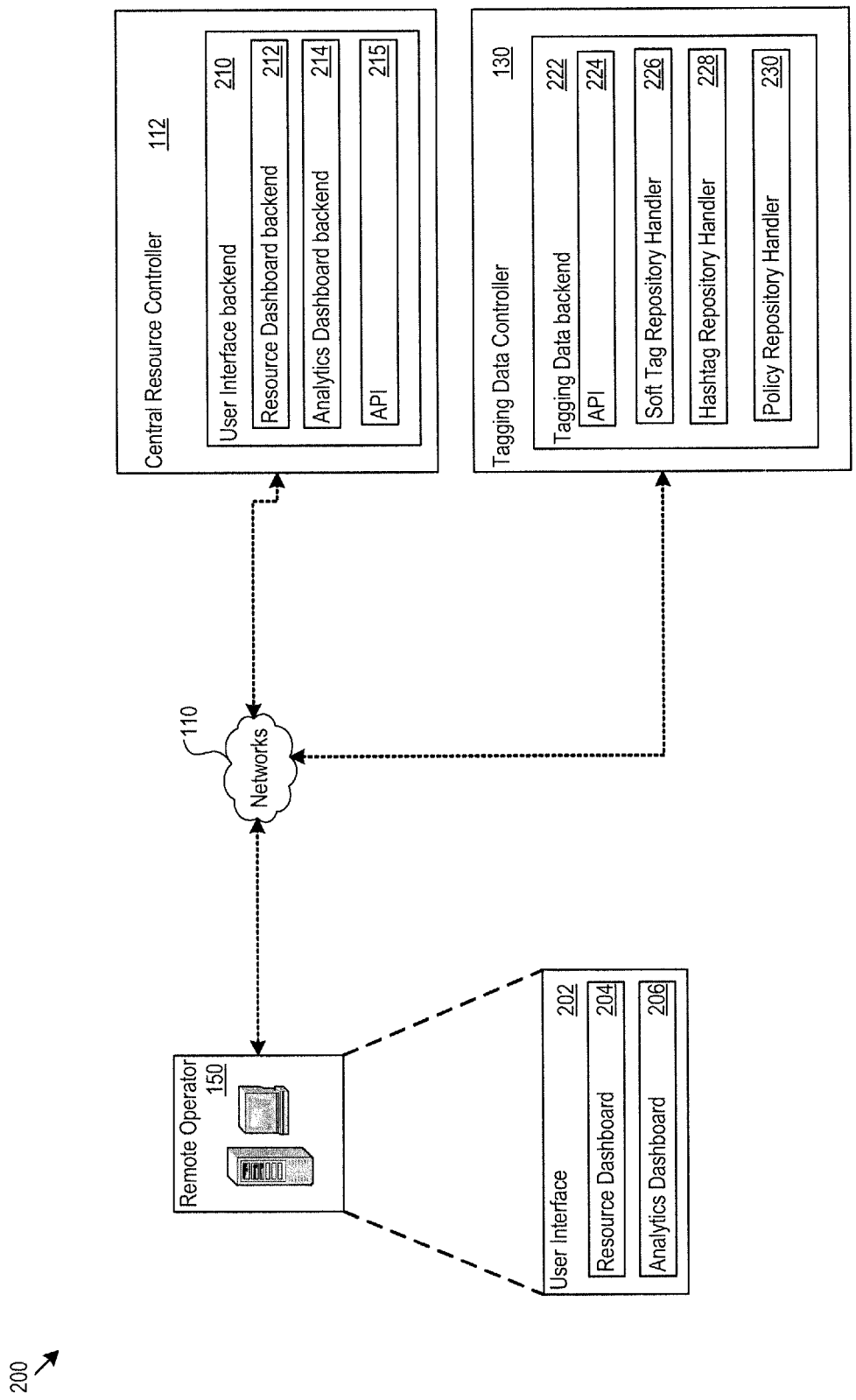
FIG. 2 illustrates a functional block diagram for the remote operator device, the central resource controller and the tagging data controller of FIG. 1.

FIG. 2 illustrates a functional block diagram 200 for the remote operator device 150, the CRC 112, and the tagging data controller 130 above. Specifically, the remote operator device 150 provides a user interface to the remote operator. For example, the user interface may include resource dashboard 204 for monitoring and controlling technical components hosted in the cloud. The remote operator may use his/her control account to login and access the resource dashboard 204. Other user interfaces may be further provided. For example, an analytics dashboard 206 may be provided to the remote operator for viewing and performing analytics of the usage and operation of technical components hosted in the cloud. The dashboards 204 and 206 may be generated, for example, by a web browser application running on the remote operator device 150. The web browser application may download the dashboard from a web server in the CRS 112 via networks 110. As such, the CRC 112 may provide a UI backend 210 including a resource dashboard backend 212 and an analytics dashboard backend 214 such as web servers for hosting the dashboards.

Input from the user interface 202 of FIG. 2, such as an unstructured note for a technical component, may be communicated to the user interface backend 210 of the CSC 112. The unstructured note may be further communicated from CRC 112 to a tagging data backend 222 of the tagging data controller 130. The tagging data backend 222 may include soft tag repository handler 226 and hashtag repository handler 228 for processing unstructured notes for technical components, creating and serving the service items discussed above. The tagging data backend 222 may further include a policy handler 230 for maintaining policies and conditions for triggering pre-configured actions and for detecting action triggers in the unstructured notes, and for maintaining or generating instructions for performing the pre-configured actions.

Finally, both the user interface backend 210 of the CRC 112 and the tagging data backend 222 of the tagging data controller 130 may further provide APIs 215 and 224 to the user interface 202 for performing functions in the dashboards 204 and 206. For example, other data resources not drawn in FIG. 1 and FIG. 2 may be provided to the user interface 202 via the APIs 215 and 224.

Figure 3:
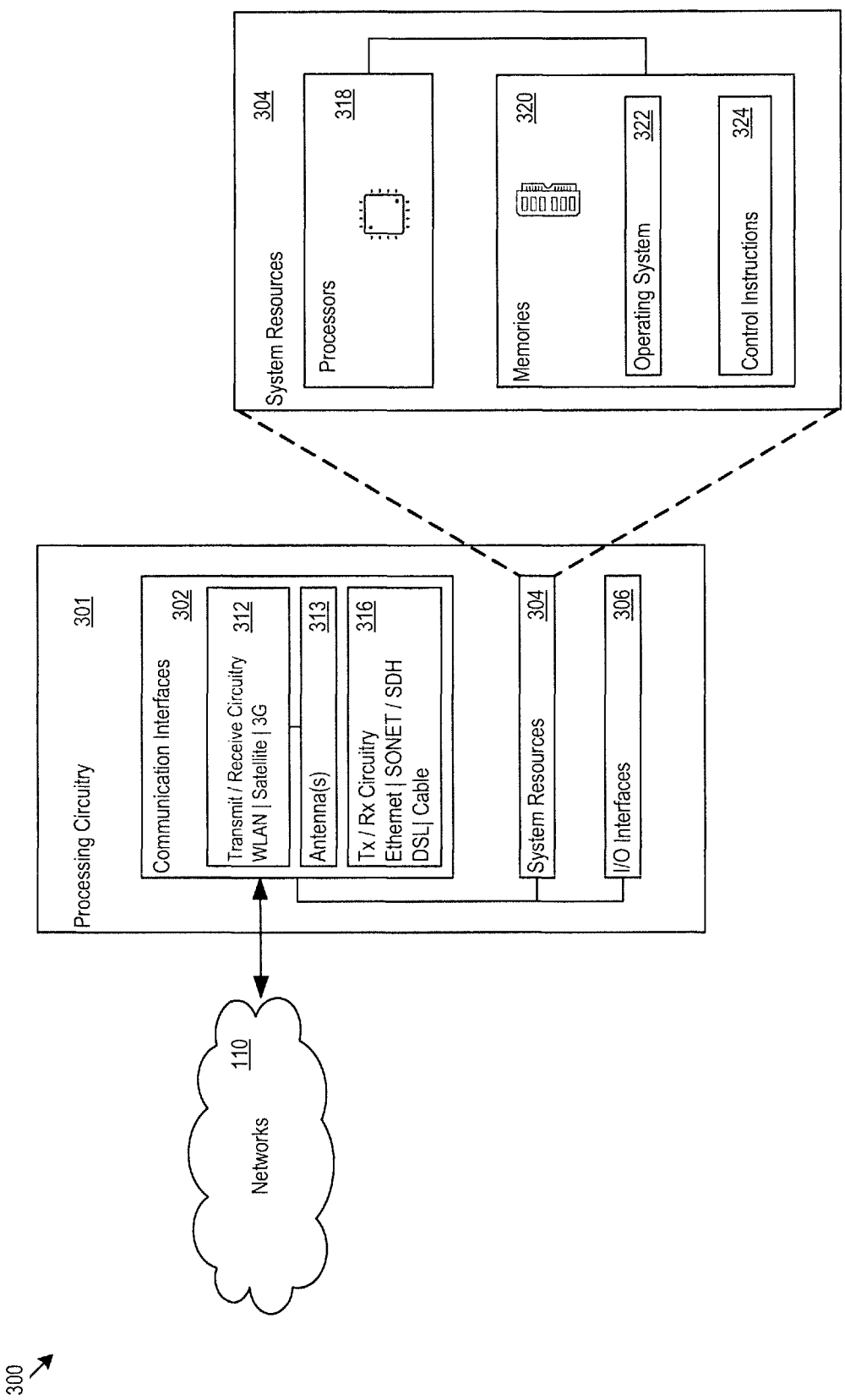
FIG. 3 shows and example processing circuitry that may be used in the global cloud hosting and control system of FIG. 1.

FIG. 3 shows an example implementation of a processing circuitry 301 for implementation of the resource controller processing circuitry 116, the tagging controller processing circuitry 118, or a processing circuitry in the remote operator device 150 of FIG. 1. The processing circuitry 301 includes communication interfaces 302, system resources 304, and input/output (I/O) interfaces 306. The I/O interfaces 306 may include graphical user interfaces (GUIs), touch sensitive displays, voice or facial recognition inputs, buttons, switches, speakers and other user interface elements. Additional examples of the I/O interfaces 306 include microphones, video and still image cameras, headset and microphone input/output jacks, Universal Serial Bus (USB) connectors, memory card slots, and other types of inputs. The I/O interfaces 306 may further include magnetic or optical media interfaces (e.g., a CDROM or DVD drive), serial and parallel bus interfaces, and keyboard and mouse interfaces.

The communication interfaces 302 may include wireless transmitters and receivers ("transceivers") 312 and any antennas 314 used by transmission and receiving circuitry of the transceivers 312. The transceivers 312 and antennas 314 may support Wi-Fi network communications, for instance, under any version of IEEE 802.11, e.g., 802.11n or 802.11ac. The communication interfaces 302 may also include wireline transceivers 316. The wireline transceivers 316 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system resources 304 may include any combination of hardware, software, firmware, or other logic. The system resources 304 may be implemented, for example, with one or more systems on a chip (SoC), application specific integrated circuits (ASIC), microprocessors, discrete analog and digital circuits, and other circuitry. The system resources 304 is part of the implementation of any desired functionality in the CRC 112, the tagging data controller 130, and the remote operator device 150. As just one example, the system resources 304 may include one or more instruction processors 318 and memories 320. The memory 320 stores, for example, control instructions 324 and an operating system 322. The processor 318 executes the control instructions 324 and the operating system 322 to carry out any desired functionality for the CRC 112, the tagging data controller 130, and the remote operator device 150.

Figure 4:
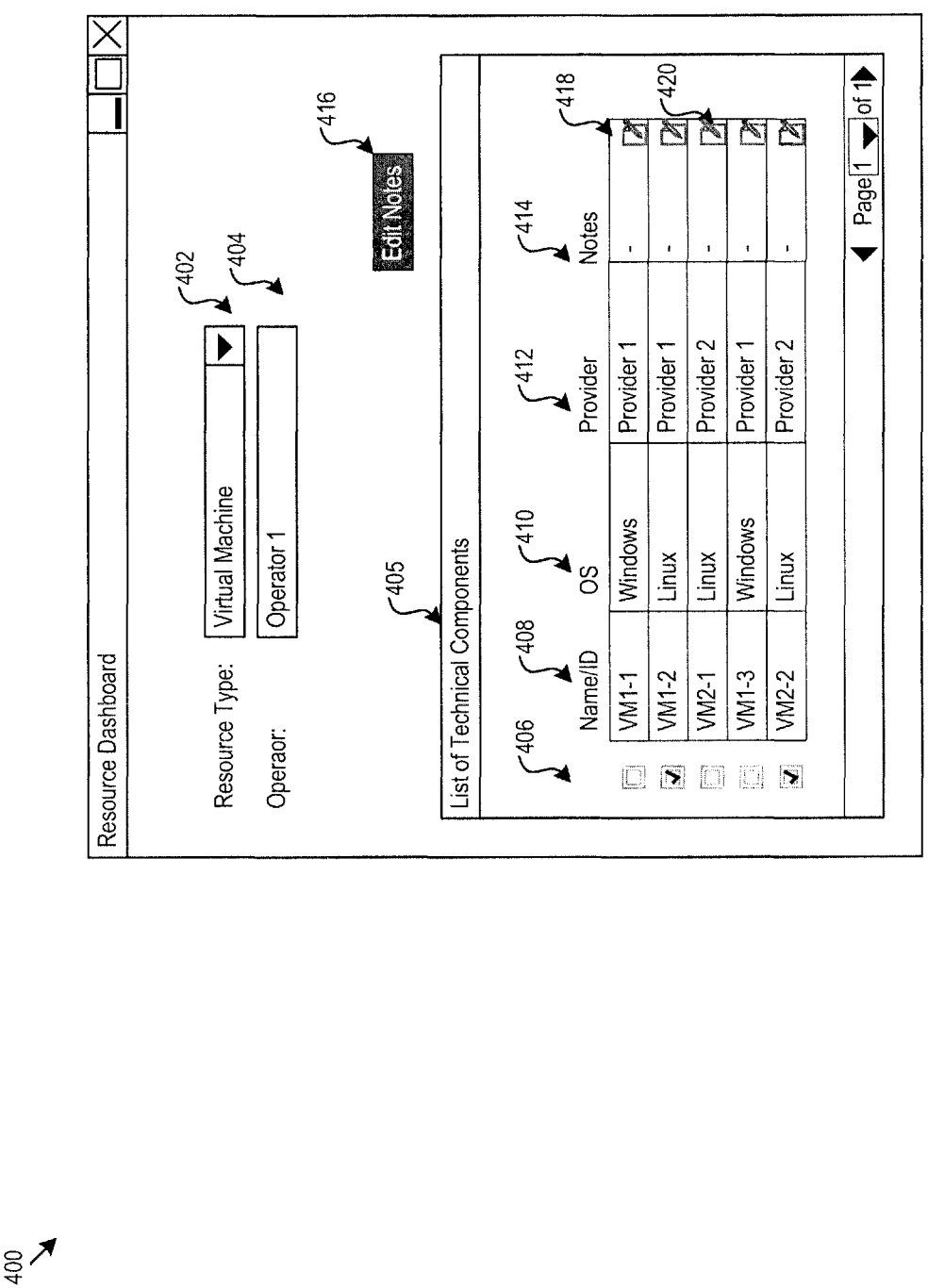
FIG. 4 shows an example user interface for controlling technical components hosted in the cloud.

FIG. 4 shows an example user interface 400 in the form of a resource dashboard for technical components on a remote operator device 150. A remote operator, e.g., operator 1, may log into the dashboard user interface 400. The user interface 400, for example may include identifier 404 for operator 1. Optionally, operator 1 may choose to view or control all or a specific type of technical components using drop down menu 402. In this particular example, operator 1 chooses to view only VMs and as a result, VMs associated with operator 1 are listed in 405. Properties for each VM may be listed, including but not limited to name 408 of the VM, operating system 410 installed in the VM, service provider 412 hosting the VM, and unstructured note 414 for the VM. The unstructured note 414 for each VM may include the currently active note for the VM, i.e., the most recently entered unstructured note for the VM by all operators.

Figure 5:
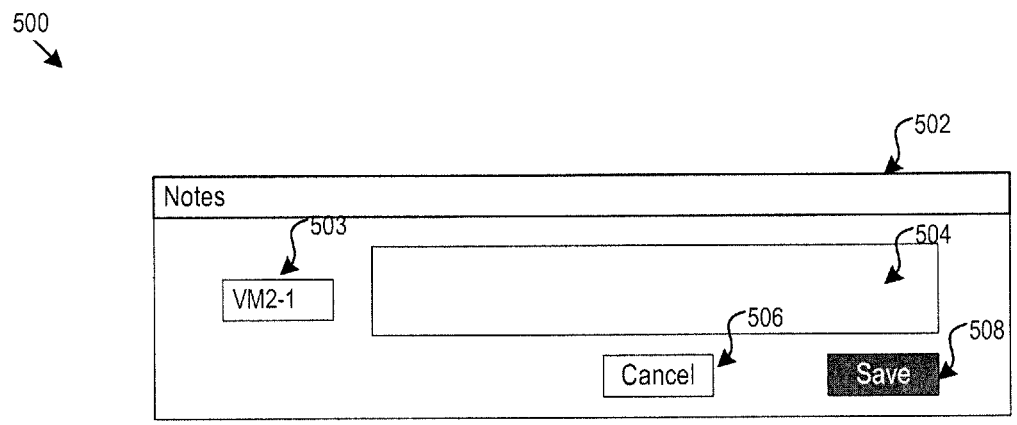
FIG. 5 illustrates example user interfaces for inputting notes for technical components.
Figure 5:
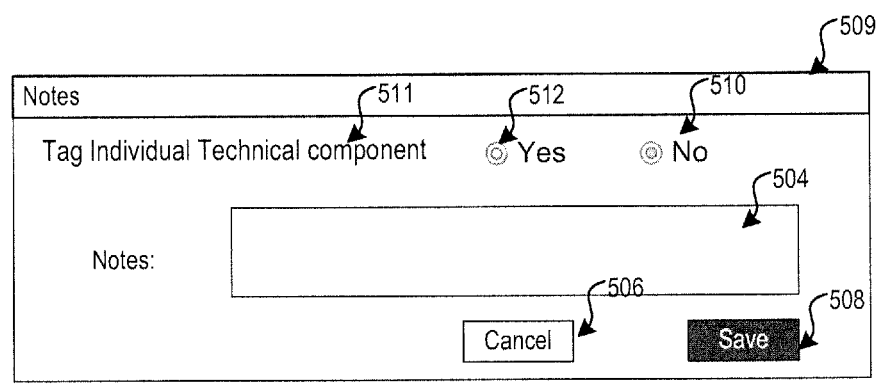
Figure 5:
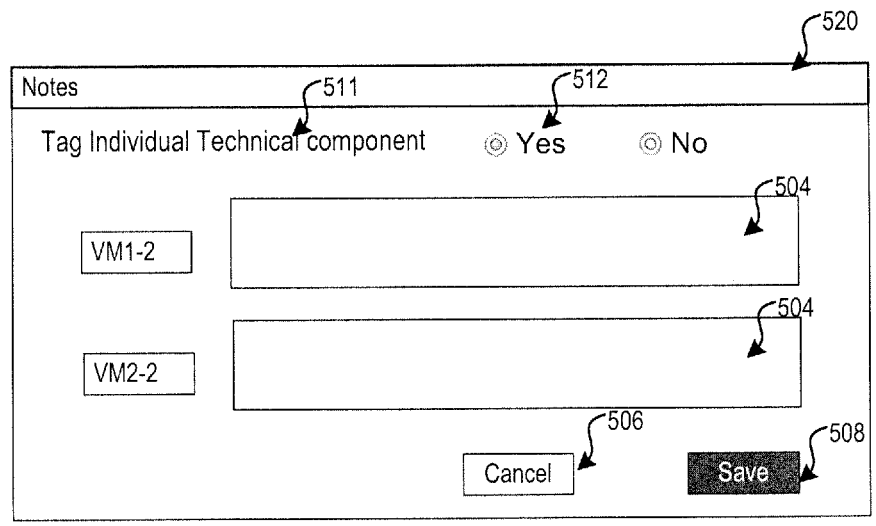

Operator 1 may enter an unstructured note for technical component in various ways. For example, Operator 1 may mouse-click one of the editing symbols 418 that responds by displaying an input field for entering an unstructured note for a particular technical component. In the example FIG. 4, Operator 1 may click the editing symbol 420 for inputting unstructured note for VM2-1. As shown in FIG. 5A, a note input user interface 502 may be presented to operator 1 upon clicking the editing symbol 420. The note input user interface 502 may include an identifier 503 for the selected technical component (VM2-1 in this case) and an input box 504 for entering unstructured note. Operator 1 may enter any unstructured note by typing in the input box 504. The notes may be discarded by selecting the "Cancel" button 506 or kept by selecting the "Save" button 508.

Returning to FIG. 4, operator 1 may enter notes for multiple technical components by first selecting these technical components by checking corresponding checkboxes 406 and then click the "Edit Notes" button 416. As a result, a note input user interface 509 in FIG. 5B may be presented to operator 1. Operator 1 may be given options 511 to enter a same note for all selected technical components or enter separate notes for each selected technical component. In FIG. 5B, by highlighting the "No" selection, it is set as a default for operator 1 to enter the same note for all selected technical components. As such, operator 1 may type an unstructured note in the input box 504, either cancel or save the note using button 506 and 508. Once the "Save" button 508 is selected, the entered unstructured note will be recorded against all selected technical components. Operator 1 may alternatively select "Yes" option 512 in FIG. 5B, prompting the note input user interface 520 to be presented as shown in FIG. 5C. In FIG. 5C, multiple input boxes are provided to operator 1 for entering separate unstructured notes for each selected technical component (VM1-2, and VM2-2 in this case). Again, operator may cancel or keep the entered unstructured notes using buttons 506 and 508.

Once notes are entered by operator 1 for selected technical components, each of these newly entered notes become an active note and is listed in the user interface 400, as shown in FIG. 6. The notes are unstructured and may contain any text or symbols. For example, the notes shown in 602 of FIG. 6 contains normal text as well as symbols such as "#" and "@". As will be descried in detail below, these symbols may be predefined and may be used as triggers for control, provisioning, and automatic communication actions.

Figure 7:
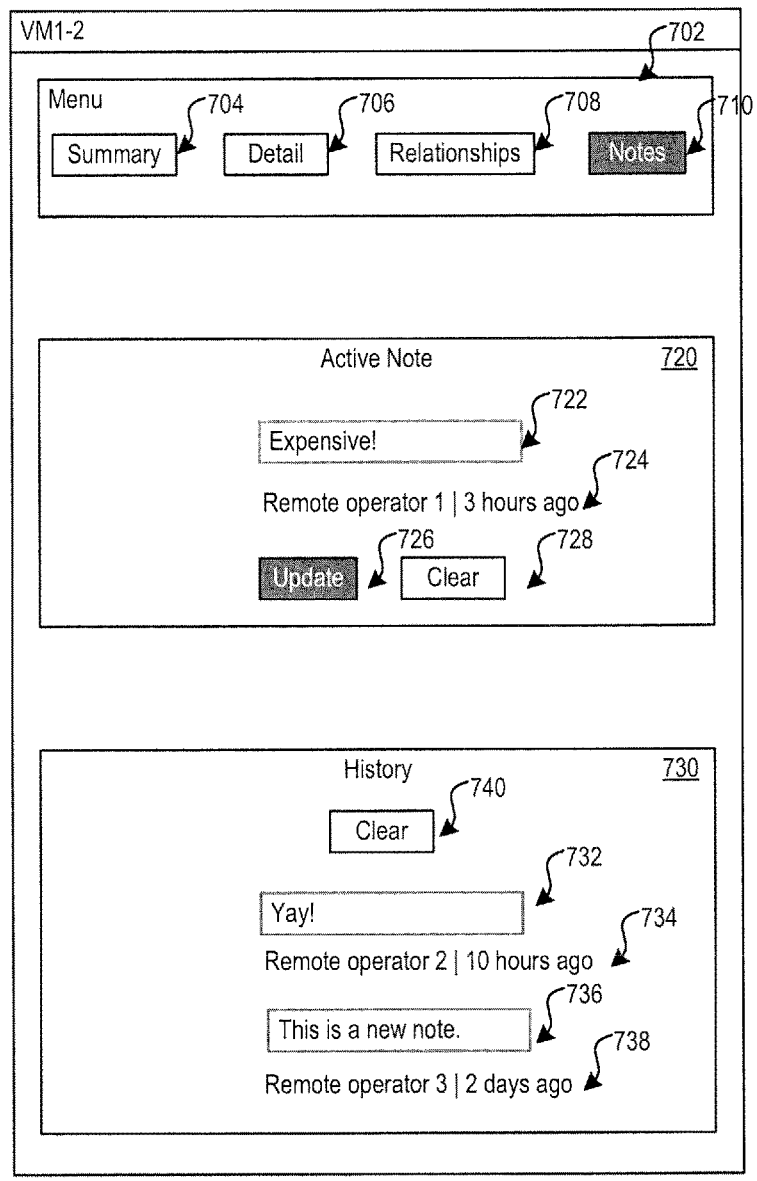
FIG. 7 shows an example user interface for displaying active and historical notes for a particular technical component.

The user interface 400 of FIG. 6 may further provide a way to operator 1 for viewing notes for each technical component in detail. For example, the user interface 400 may be configured such that operator 1 may click on any technical component, e.g., technical component VM1-2 labeled as 603 in FIG. 6, to bring up a technical component interface 700 of FIG. 7 for VM1-2. The technical component interface 700 may, for example, include a menu for operator 1 to select one of a set of predefine information categories of the technical component to view. These predefined information categories may, for example, include "summary" 704, "detail" 706, "relationships" 708, and "notes" 710. Operator 1 may select an information category by clicking the corresponding menu item. For example, when the category "notes" is selected, detailed note information is presented to operator on sections 720 and 730 of the technical component interface 700.

In particular, block 720 in the technical component interface 700 shows information about the active note, i.e., the most recently entered unstructured note for VM1-2, including the content 722 of the active unstructured note, the author and input time 724 of the note. Further, if the active note was entered by operator 1, operator 1 may be further provided an "update" button 726 for updating the active note, and/or a "clear" button 728 for removing the active note. If the active note was entered by an operator other than operator 1, these two buttons may or may not be provided. Optionally, a button may be further provided such that when that button is selected, operator 1 may be directed to the note input user interface 500 of FIG. 5 for entering a new note, and once entered, the new note becomes active.

Block 730 in the technical component interface 700 shows history information about notes for VM1-2, including a list of prior notes 732 and 736, and their authors and input times 734 and 738. A button 740 may be further provided for operator 1 to clear the note history for VM1-2.

Figure 8:
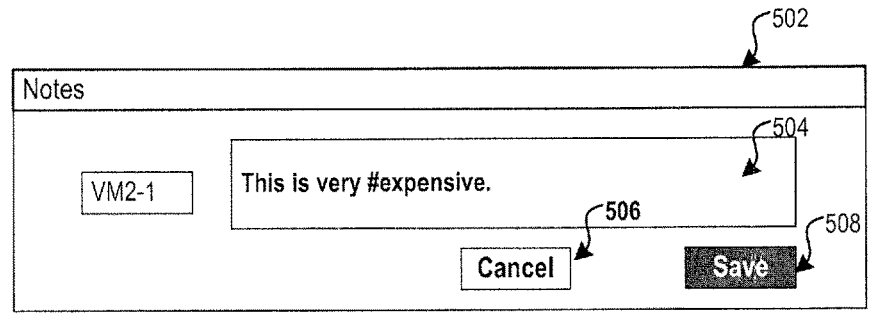
FIG. 8 shows example user interfaces for inputting notes for technical components including a special symbol for hashtags.
Figure 8:
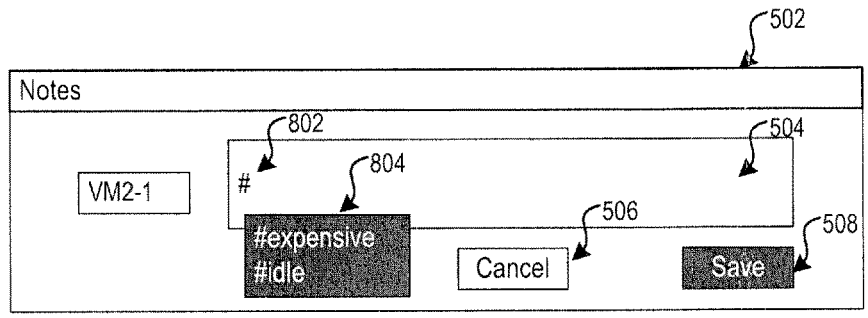
Figure 8:
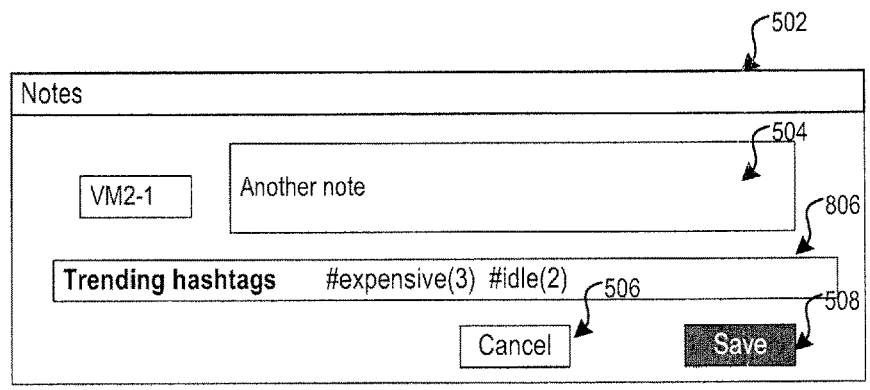

The special symbols such as "#" and "@" discussed above and appearing in the list 602 of FIG. 6 may be predefined and used as triggers for control, provisioning, and automatic communication actions. For example, the symbol "#" may be used as an indication of a hashtag. That is, a string of characters following "#" and ending with, e.g., a space or other predefined delimiters, may be recognized as a hashtag. For example, in the note input user interface 502 of FIG. 8A, operator 1 types a note 504 "This is very # expensive." The note input user interface may monitor the note while being typed and detect the "#" symbol and recognize "expensive" as a hashtag. Upon, for example, completing the note input by clicking the "Save" button 508, the recognized hashtag may be communicated to the tagging data controller of FIG. 1 and recorded into the hashtag repository 115. Alternatively, the detection of the "#" symbol and extraction of the hashtag may be performed by the tagging data controller after the entire note is submitted.

As shown in FIG. 8B, the note input user interface 502 may be further configured to provide operator 1 a list of recorded hashtags 804 as soon as the symbol "#" 802 is detected by the note input user interface 502. Specifically, upon detecting the predefined symbol "#", the note input user interface 502 recognizes that operator 1 is about to input a hashtag and proceeds to proactively and automatically suggest hashtags previously recorded in the hashtag depository 115 of FIG. 1. These suggested hashtags may be a set of hashtags previously used by operator 1. Alternatively, these suggested hashtags may be a set of hashtags previously used by a group of operators for the particular technical component (VM2-1, in this case). As another alternative, these suggested hashtags may be hashtags used by other OUs when controlling and provisioning similar technical components. These suggested hashtags may be listed in order of use frequency with the most frequently used hashtag being at the top of the suggested list. Operator 1 may select a hashtag from the list and upon such selection, the selected hashtag is automatically filled in the body of the note 504. Operator 1 may alternatively ignore the suggestion and continue typing. As operator 1 continues to type a set of characters following the "#" symbol, the note input user interface 502 further narrows down the suggested list of hashtags 804 such that each of the presented hashtags in the list includes a subset of characters that match what have been typed by operator 1 following symbol "#". The note input user interface 502 may remove the suggested list of hashtags from being displayed when no matching can be found.

The suggested list of hashtags may be obtained by the note input user interface 502 from the tagging data controller 130 of FIG. 1 in real-time by making real-time inquiries to the tagging data controller 130. These inquiries may be made via the API 224 of FIG. 2 provided by the tagging data controller. Upon receiving the real-time inquiries, the tagging data controller may search the hashtag repository 115 of FIG. 1 to determine a list of matching hashtags and return the list to the note input user interface 502 of FIG. 8.

The note input user interface 502 may further show trending of hashtags, as shown by 806 of FIG. 8C. Specifically, upon invoking the note input user interface 502, the tagging data controller 130 may be inquired to provide preprocessed or real-time processed trending information of hashtags. The trending information of hashtags may represent the number of times the hashtags have been used by either operator 1, the OU authorizing operator 1, other OUs, or for a particular type of technical components. The trending information block 806 may alternatively show trending of a subset of hashtags having higher usage.

Figure 9:
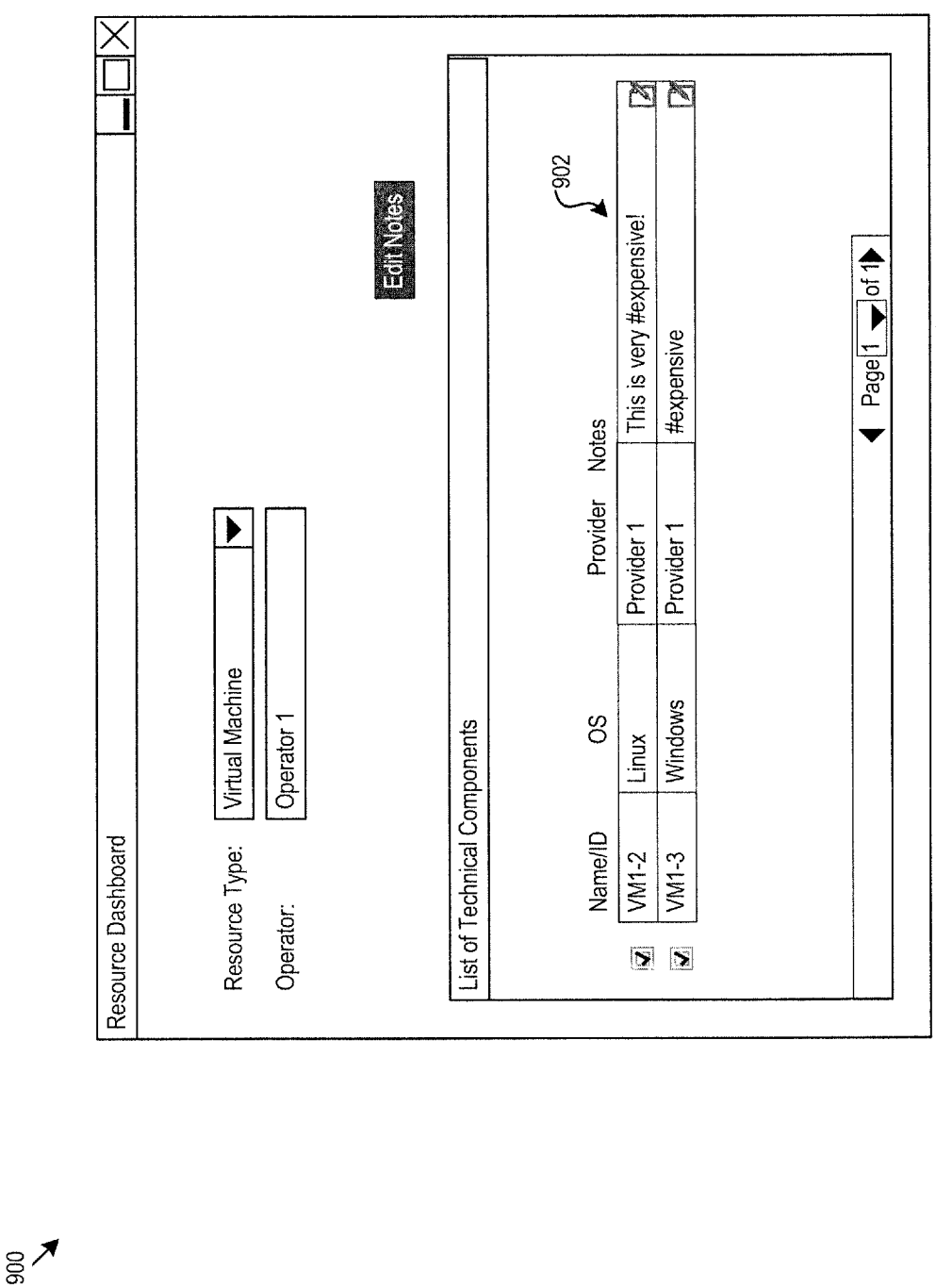
FIG. 9 shows an example user interface for displaying technical components having notes containing a special symbol.

Operator 1 may further be provided a user interface for viewing a list of technical components associated with a particular hashtag. For example, when viewing the full list of technical components in the user interface 400 of FIG. 6, operator 1 may select the particular hashtag, e.g., hashtag "expensive" 604, to invoke the user interface 900 shown in FIG. 9. Specifically, in list 902 of the user interface 900, only the technical components having notes embedded with hashtag "expensive" are shown. Alternatively, operator 1 may select the "#" symbol in list 602 of FIG. 6 and technical components having notes embedded with any hashtag may be presented to operator 1 in list 902 of the user interface 900.

Certain hashtags may be reserved for triggering automatic provisioning, control, and communication actions. For example, detection of hashtag, e.g., "expensive" following the special symbol "#" may be trigger an automated alerts, such as email to members of the OU, alerting them that the technical components has been tagged with the hashtag "expensive". For another example, detection of hashtag, e.g., "expensive" may trigger a provisional action that places the technical component in a resource group with restricted access. In a further example, a hash tag "zombie" following the special symbol "#" may trigger decommission the technical component, and a hash tag "glutton" may trigger automatic resizing of the technical component.

As another example, a special symbol "@" may be predefined. The symbol "@" may be used to trigger any pre-defined actions. For instance, the predefined symbol "@" may be used for triggering communication actions via email. As shown in the note input user interface 502 of FIG. 10A for technical component VM2-1, when the symbol "@" 1002 is detected by the note input user interface 502 as it is being typed by operator 1, a list of suggested entities associated with VM2-1 may be presented in menu 1004. The entities may be identified by email addresses for specific individuals, group email address, or other communication channels. These entities may include among others, other operators of the OU. Operator 1 may choose one, more, or all items listed in the menu 1004. The chosen entities may be populated in the input box 504 and operator 1 may continue to type the unstructured note, as shown in the input box 504 of FIG. 10C. Operator 1 may alternatively ignore the suggestion and continue typing. As operator 1 continues to type a set of characters following the "@" symbol, the note input user interface 502 further narrow down the suggested list of suggested entities such that the presented entities in the list include a subset of characters that match what have been typed by operator 1, as shown by the typed content 1006 and the list of suggested entities 1008 of FIG. 10B. The note input user interface 504 may remove the menu of suggested list of entities from being displayed when no matching entities can be found.

The suggested list of entities may be obtained by the note input user interface 502 from the CSC 112 of FIG. 1 in real-time by making real-time inquiries to the CSC 112. These inquiries may be made via the API 215 of FIG. 2 provided by the CSC 112. Upon receiving the real-time inquiries, the CSC 112 may search an entity database (not shown in FIG. 1) to obtain a list of suggested entities. The entity data base, for example, my include a database for the operators authorized by the OU. The entity database may reside with and be part of the CSC 112. Alternatively, the entity database may reside on a separate and independent server that provides a list of suggested entities to the CSC 112 upon request. In some implementation, the returned list of entities may include IDs, names, and/or email addresses.

Figure 10:
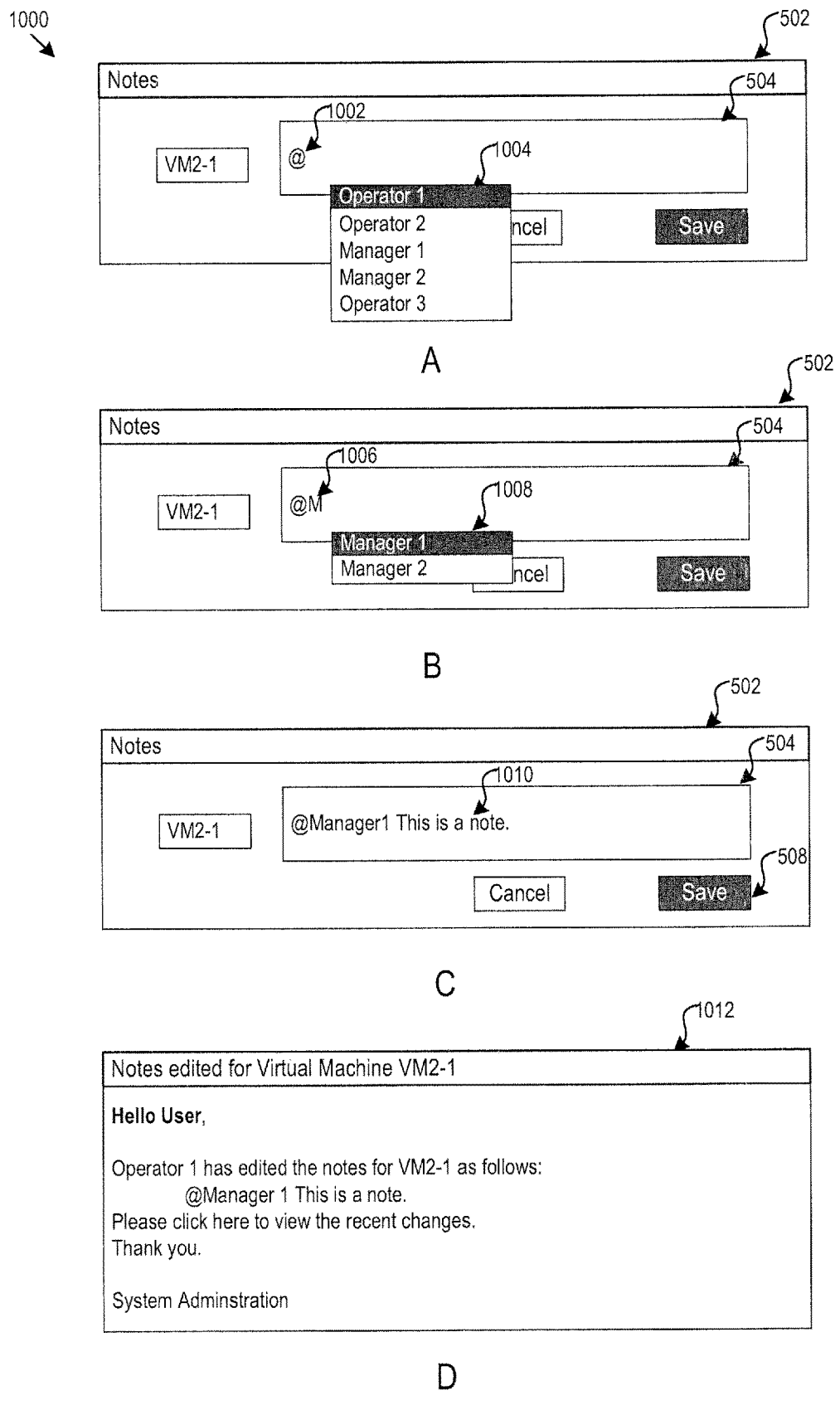
FIG. 10 illustrates example user interfaces for inputting notes for technical components including another special symbol.

Upon completing entering a note 1010 of FIG. 10C including the "@" symbol, operator 1 may click the "Save" button 508. Thereafter, the remote operator device 150 via the user interface 202 of FIG. 2 may detect the "@" symbols in the unstructured note 1010 entered by operator 1 and trigger automatic sending of emails to entities specified after the @symbols and before predetermined delimiters. If the email addresses of the specified entities have not yet been inquired by the operator device from the CRC 112, they may now be obtained from the CRC 112 via additional inquiries. The operator database containing email address of entities may be maintained by the CRC 112 or may alternatively be maintained by a separate and independent server.

Alternatively, the automatic emails may be triggered and sent by the CRC 112 rather than the remote operator device 150. Specifically, the unstructured note 1010 of FIG. 10C entered by operator 1 may be communicated to the CRC 112 and the tagging data controller 130 of FIG. 1. The tagging data controller 130 may process the unstructured note 1010 in similar manner as described above. The CRC 112 may process the unstructured note 1010, detect "@" symbols contained therein, obtain email addresses of the entities specified after the "@" symbols and before the predetermined delimiters, and automatically send emails to the specified entities.

Exemplary content of the emails sent either by the remote operator device 150 or the CRC 112 is shown in 1012 of FIG. 10D. The content, for example, may include the entire unstructured note. Context information including the name of the technical component (VM2-1 in this exemplary case) and the author of the note (Operator 1 in this exemplary case) may be further included in the content of the email 1012.

Figure 11:
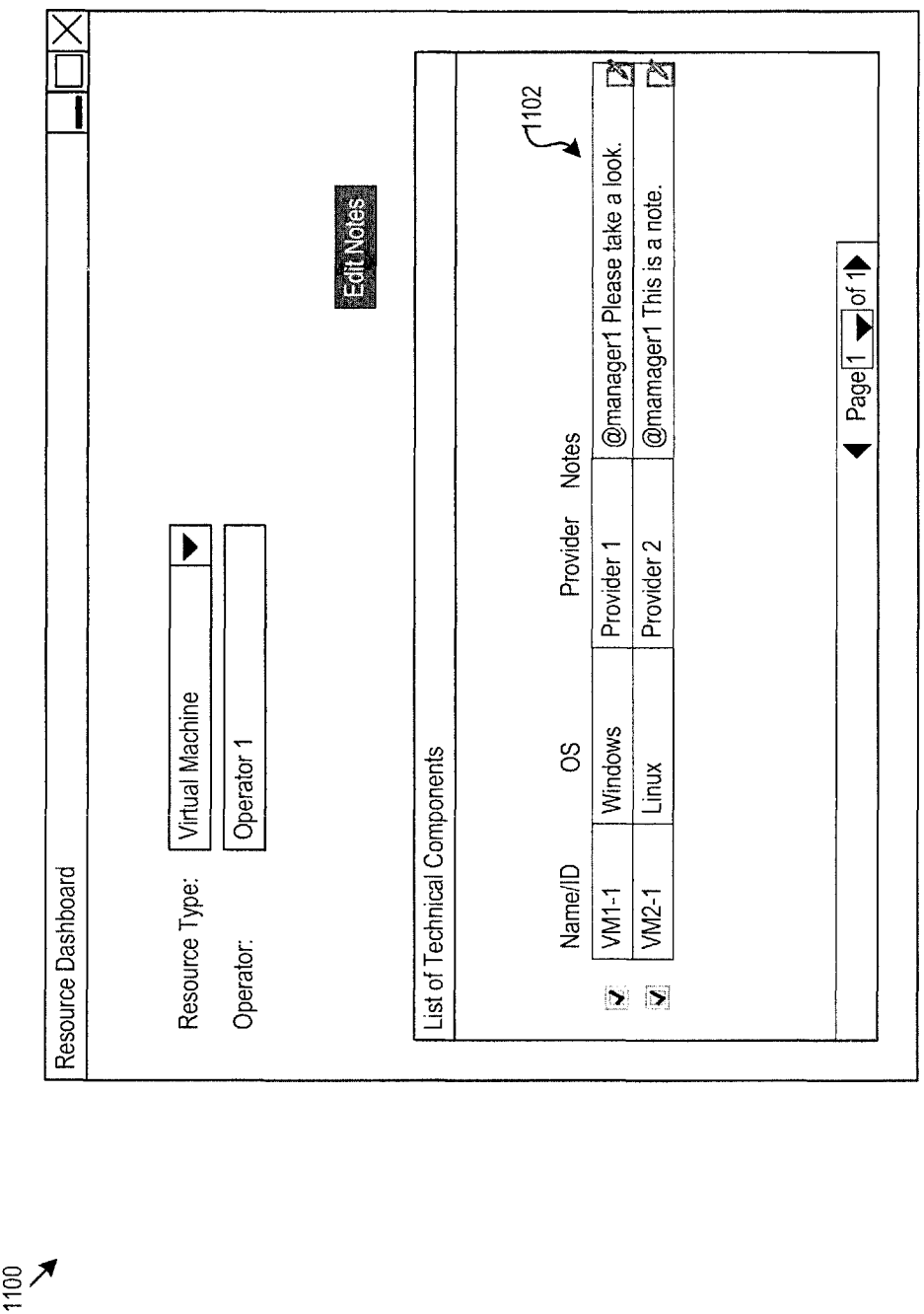
FIG. 11 shows an example user interface for displaying technical components having notes containing another special symbol.

The user interface at the remote operator device 150 may be further configured to display a list of technical components have unstructured notes containing the predefined "@" symbol. For example, operator 1 may click an operator name 606 in the list of unstructured notes 602 of FIG. 6. As a result, the user interface 1100 of FIG. 11 may be presented to operator 1. The user interface 1100 may contain technical components having unstructured notes including the clicked operator name, as shown by 1102 of FIG. 11. Alternatively, operator 1 may click the "@" symbol in the list 602 of FIG. 6 and a user interface showing any technical component having unstructured notes including the "@" symbol may be presented to operator 1.

It should be noted that an unstructured note may contain any number of predefined symbols, e.g., both the predefined "#" and "@" symbols. The principles of operation described above for the "#" symbol and the "@" symbol both apply. Further, the predefined "#" and "@" symbols are only two examples of possible predefined symbols. Other symbols may be predetermined for triggering other types of control, provisioning, and communication actions either by the remote operator device 150 or the CSC 112 of FIG. 1. Further, the CSC 112 may be configured to perform natural language processing on the unstructured notes. Semantic information may be extracted from unstructured notes using a natural language model based on, for example, machine learning algorithms. The natural language model may be a semantic classifier for classifying each unstructured note. Depending on the classification of the one or more unstructured notes related to a technical component, a control, provisioning, or communication action may be triggered. The correspondence between the classification of the one or more unstructured notes and the action to be triggered may be specified in the policy repository 120. For example, a policy may instruct an automatic power-off and power-on schedule for the technical component if more than e.g., half of the unstructured notes associated with the technical component are classified to mean that the technical components is needed only during business hours.

The unstructured notes in the tagging data repositories 130 may be processed and optionally combined with the triggered control, provisioning, and communication actions to provide a conversational history of the technical component. The conversational history may be stored and updated in a separate repository and provided to a remote operator via the resource dashboard or the analytics dashboard. Alternatively, the conversational history may be generated from the tagging data repository on demand. The conversational history may provide more thorough audit trails of the technical components than any other compilation of purely technical or transactional data such as a configuration history.

Further analytics on the unstructured notes may be performed. The output of the analytics may be provided to a remote operator via either the resource dashboard or the analytics dashboard. For example, as shown by 1202 of FIG. 12, analytics on trending of usage of hashtags within the OU may be provided to the remote operator via the resource dashboard or analytics dashboard. The trending of usage of the hashtags by the remote operators of the OU may be visually represented by, e.g., font size of the hashtags. For example, larger font size may represent more frequent usage. Alternatively or additionally, colors may be used for visualizing trending of the hashtags. For example, red font may be used to represent higher usage. The hashtags may be arranged in any geometric order. For example, the hashtags may be arranged alphabetically. Alternatively, hashtags with higher usage may be arranged ahead of the hashtags with lower usage. For another example, the hashtags may be arranged in a circle with the more frequently used hashtags located closer to the center of the circle.

Figure 12:
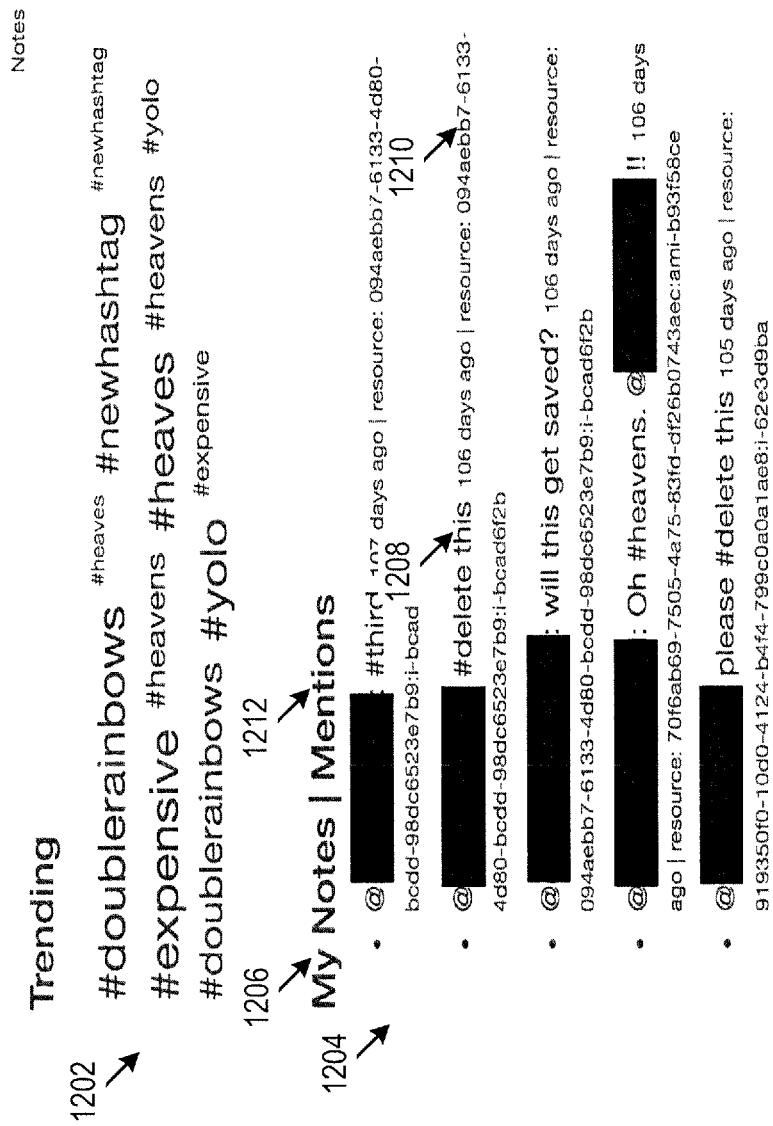
FIG. 12 illustrate an example of analytics on notes for technical components.

As shown by 1204 of FIG. 12, a remote operator may further obtain a list of notes entered by him/her for various technical components via either the resource dashboard or the analytics dashboard. Upon request by the remote operator for such a list using the example "My Notes" option 1206, the CRC 112 and the tagging data controller 130 process the unstructured notes for various technical components to compile a list of notes entered by the remote operator. The list may be ordered by date or in any other manner. The notes in the list may be further organized in groups each for a particular technical component. Each note shown in 1204 of FIG. 12 may contain the note itself 1208 and the ID of the corresponding technical component 1210. Each note may contain hyperlinks. For example, clicking on the ID 1210 of a technical component may redirect the remote operator to a user interface for viewing information of the clicked technical component.

Further, the remote operator may be provided an option to view notes in which the remote operator is mentioned via, e.g., the "@" symbol. For example, selectable option "Mentions" 1212 may be provided together with the "My Notes" option 1206. Upon selecting option 1212, a list of notes entered by any remote operator that mention the requesting remote operator may be shown. Again, the list may be ordered by date or in any other manner. The notes in the "Mentions" list may be further organized in groups each for a particular technical component. Each note may contain the note itself and the ID of the corresponding technical component. Each note may contain a hyperlink to the corresponding technical component for, e.g., redirecting the remote operator to a user interface for viewing information of the technical component.

The analytics interfaces above are mere examples that facilitate visualization and organization of information contained in the unstructured notes. These analytics may be provided as widgets in the resource dashboard or analytics dashboard for efficient management of technical components of the OU.

Figure 13:
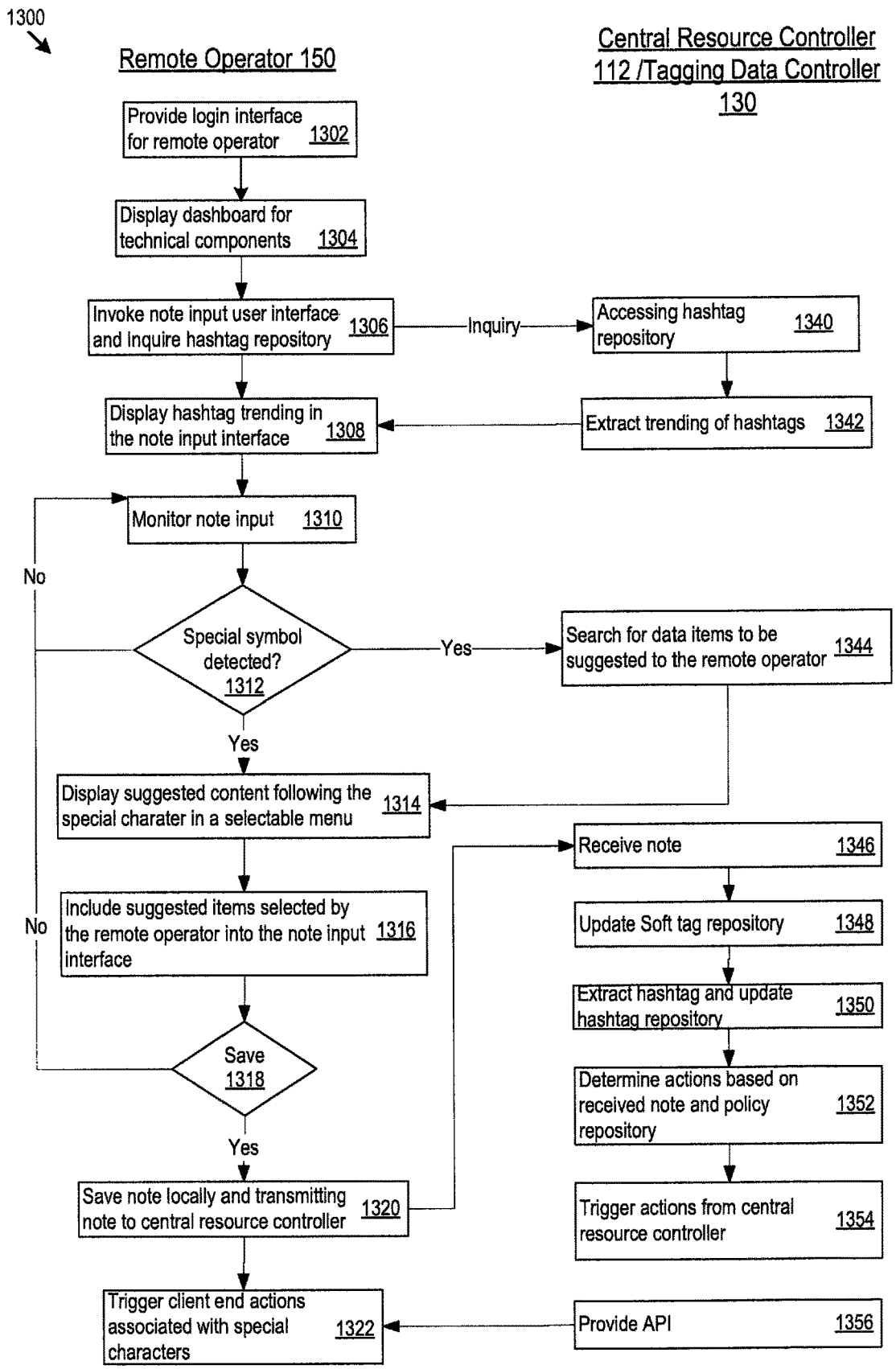
FIG. 13 shows an example flow chart for processing notes by the global could hosting and control system.

FIG. 13 shows logic 1300 that the global cloud hosting and control system 100 may implement with respect to the remote operator device 150 and the CRC 112/tagging data controller 130. The remote operator device provides a login interface for a remote operator to log into a CRC account of the remote operator (1302). A user interface in the form of, e.g., a dashboard for technical components is displayed by the remote operator device (1304). A note input user interface is invoked by the operator for one or more technical components (1306). Additionally, a hashtag inquiry may be sent to the tagging data controller 130 for hashtag trending information (1306). The tagging data controller receives the inquiry and access the hashtag repository (1340). The tagging data controller processes the data from the hashtag repository, extracts trending information for hashtags, and returns the hashtag trending information to the user interface at the remote operator device (1342). The note input user interface at the remote operator device further displays the hashtag trending information (1308).

Continuing with FIG. 13, the note input user interface monitors the input of unstructured note by the remote operator (1310). The note input user interface determines whether a predetermined special symbol is input by the remote operator (1312). If no special symbol is detected, the note input user interface repeats 1310 and continues to monitor the note input. If a special symbol is detected, inquiry may be further made to the CRC 112 for obtaining a suggested list of data items (1312). The CRC 112 may search for data items according to the detected special symbols (1344). For example, the CRC 112 may search for data items (such as specific hashtags) in the hashtag repository if the detected special symbol is "#". For another example, the CRC 112 may search for data items (such as operator names and email addresses) in an operator database if the detected special symbol is "@". The CRC 112 further returns the searched data items as suggestions to the note input user interface at the remote operator device (1344). The note input user interface of the remote operator device receives the suggested data items from the CSC 112 and displays the suggested data items to the remote operator in the note input user interface as selectable list of menu items (1314). The note input user interface in the remote operator device includes suggested data items that are selected by the remote operator from the list of menu items into the unstructured note being entered following the detected special symbol (1316).

Continuing with FIG. 13, the note input user interface detects whether a "Save" button included in the note input user interface is selected by the operator (1318). If the "Save" button is not selected, the note input user interface returns to 1310 and continues monitoring the note input. If the "Save" button is selected, the remote operator device may communicate the entered unstructured note to the CSC 112. Optionally, the remote operator device 150 may save the unstructured note locally.

The CSC 112 or the tagging data controller 130 receives the unstructured note (1346). The tagging data controller 130 then processes the unstructured note and updates the soft tag repository 114 (1348). The tagging data controller 130 extracts hashtags from the unstructured note and updates the hashtag repository (1350). The unstructured note may be further processed to create other service items. The unstructured note may be processed by the tagging data controller along or together with the policy repository to extract predetermined action triggers and instruction for performing predefined actions associated with the triggers (1352). The predefined actions may include, for example, automatic decommission of the technical component after a specified period of time, automatic placement of the technical component on a watch list for later viewing by another remote operator, or automatic placement of the technical component in a resource group with restricted access. These actions for controlling, provisioning of technical components and automatic communication between operators are then triggered by CSC 112 or the data tagging controller 130 (1354). Alternatively, action triggers may be derived from the unstructured note and the corresponding actions may be triggered by the remote operator device (rather than the CSC 112 or the data tagging controller 130) at 1322. For the extraction of action triggers and execution of controlling, provisioning and communication actions, the remote operator device may need to communicate with API components of the CSC 112 and data tagging controller 130 (1356).

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A system comprising:
    a tag database configured to store metadata tags;
    a technical component instantiated in a virtual hosting platform for an organizational unit, where the technical component comprises a virtual machine and wherein the metadata tags comprise free-form notes descriptive of evaluation of an operating configuration of the technical component; and
    a central computing resource controller for provisioning the operating configuration of the virtual machine, the central computing resource controller comprising:
        communication circuitry operable to establish a data connection with the virtual hosting platform, a remote operator authorized by the organizational unit, and the tag database; and
        control circuitry configured to:
            provide, via the communication circuitry, a user interface to the remote operator for entry of a free-form note associated with the technical component;
            detect an input of a predefined symbol in the free-form note by the user interface while the free-form note is being input;
            generate at the user interface upon detecting the predefined symbol a menu;
            provide selectable data items to the menu at the user interface for the remote operator to select and embed in the free-form note;
            accept, from the user interface, the free-form note embedded with at least one data item selected from the menu as an entered metadata tag associated with the virtual machine;
            send the entered metadata tag to the tag database for storage;
            extract content information from the entered metadata tag and content information from at least one other metadata tag, the at least one other metadata tag being entered by another remote operator and previously stored in the tag database, wherein the content information from the entered metadata tag and the at least one other metadata tag each indicate and target the same virtual machine; and
            automatically generate at least one scheduled task to modify virtual resource allocation for the virtual machine based on the content information extracted from the entered metadata tag and the at least one other metadata tag.

2. The system of claim 1, where the control circuitry is configured to provide the user interface further for:
    generating an action trigger upon detecting the predefined symbol at the user interface; and
    automatically performing at the user interface a pre-configured action corresponding to the action trigger.

3. The system of claim 2, where the pre-configured action comprises automatically sending an email derived from the entered metadata tag to an entity associated with the organizational unit.

4. The system of claim 1, where the control circuitry is further configured to:
    generate an action trigger upon determining that a condition for a pre-configured action is met for the technical component responsive to content in the entered metadata tag; and
    automatically perform the pre-configured action for the technical component responsive to the action trigger.

5. The system of claim 4, where the condition for the pre-configured action is met when the entered metadata tag includes the predefined symbol.

6. The system of claim 5, where the predefined symbol is used as a preceding indicator of an identification of an entity associated with the organizational unit and included in the entered metadata tag, and where the pre-configured action comprises automatically sending by the system an email derived from the entered metadata tag to the entity.

7. The system of claim 4, further comprising a policy database operable to store a policy specifying conditions to be met for the action trigger.

8. The system of claim 1, where the control circuitry is further configured to extract a portion of the entered metadata tag and include the extracted portion into a service item.

9. The system of claim 8, where the predefined symbol is used as a preceding indicator of a hashtag included in the entered metadata tag, where the extracted portion of the entered metadata tag comprises the hashtag.

10. The system of claim 8, where the tag database comprises:
    a metadata tag database for storing the entered metadata tag; and
    a service item database for storing the service item.

11. The system of claim 8, where the control circuitry is further configured to obtain a statistical property of the service item and communicate the statistical property to the user interface for display.

12. The system of claim 1, where the predefined symbol is used as a preceding indicator of an identification of an entity associated with the organizational unit and included in the entered metadata tag, and where the selectable data items in the menu generated at the user interface comprises the identification of the entity.

13. The system of claim 1, where the predefined symbol is used as a preceding indicator of a hashtag, and where the selectable data items in the menu generated at the user interface comprise hashtags extracted from the tag database.

14. The system of claim 1, wherein to modify the virtual resource allocation for the virtual machine comprises one of decommission of the virtual machine, placement of the virtual machine on a watch list, or placement of the virtual machine in a research group with restricted access.

15. A method for tagging a technical component of an organizational unit in a virtual hosting platform by a central computing resource controller, the method comprising:
providing a tag database for storing metadata tags for a technical component, wherein the technical component comprises a virtual machine instantiated in the virtual hosting platform and wherein the metadata tags comprise free-form notes descriptive of evaluation of an operating configuration of the technical component;
providing a user interface to a remote operator of the technical component for entry of a free-form note associated with the technical component;
detecting an input of a predefined symbol by the user interface while the free-form note is being input;
generating at the user interface upon detecting the predefined symbol a menu containing data items as options selectable by the remote operator;
embedding a data item selected by the remote operator from the menu into the free-form note being entered;
accepting, from the user interface, the free-form note embedded with the selected data item as an entered metadata tag associated with the virtual machine;
sending the entered metadata tag to the tag database for storage;
extracting content information from the entered metadata tag and content information from at least one other metadata tag, the at least one other metadata tag being entered by another remote operator and previously stored in the tag database, wherein the content information from the entered metadata tag and the at least one other metadata tag each indicate and target the same virtual machine; and
automatically generating at least one scheduled task to modify virtual resource allocation for the virtual machine based on the content information extracted from the entered metadata tag and the at least one other metadata tag.

16. The method of claim 15, further comprising:
generating an action trigger upon determining that a condition for a pre-configured action is met for the technical component responsive to content in the entered metadata tag; and
automatically performing the pre-configured action for the technical component responsive to the action trigger.

17. The method of claim 16,
where the condition for the pre-configured action is met when the entered metadata tag includes the predefined symbol;
where the predefined symbol is used as a preceding indicator of an identification of an entity associated with the organizational unit and included in the entered metadata tag; and
where the pre-configured action comprises automatically sending by the central computing resource controller an email derived from the entered metadata tag to the entity.

18. The method of claim 15, further comprising extracting a portion of the entered metadata tag and including the extracted portion into a service item.

19. The method of claim 15, where the predefined symbol is used as a preceding indicator of an identification of an entity associated with the organizational unit and included in the entered metadata tag, and where the data items in the menu generated at the user interface comprises the identification of the entity.

20. The method of claim 15, where the predefined symbol is used as a preceding indicator of a hashtag, and where the data items in the menu generated at the user interface comprise hashtags extracted from the tag database.

21. The method of claim 15, where to modify the virtual resource allocation for the virtual machine comprises one of decommission of the virtual machine, placement of the virtual machine on a watch list, or placement of the virtual machine in a research group with restricted access.

* * * * *